(12) United States Patent
Franzen et al.

(10) Patent No.: US 6,551,043 B2
(45) Date of Patent: Apr. 22, 2003

(54) LOADING DEVICE FOR ISO CONTAINERS

(75) Inventors: Hermann Franzen, Mönchengladbach (DE); Joachim Kröll, Jüchen (DE); Mathias Dobner, Rommerskirchen (DE)

(73) Assignee: Gottwald Port Technology GmbH, Düsseldorf (DE)

( * ) Notice: Subject to any disclaimer, the term of this patent is extended or adjusted under 35 U.S.C. 154(b) by 43 days.

(21) Appl. No.: 09/928,634

(22) Filed: Aug. 13, 2001

(65) Prior Publication Data
US 2002/0044854 A1 Apr. 18, 2002

(30) Foreign Application Priority Data
Aug. 11, 2000 (DE) .......................... 100 40 947

(51) Int. Cl.[7] .............................. B63B 27/12
(52) U.S. Cl. .............. 414/140.3; 212/325; 212/270; 414/141.3; 414/803
(58) Field of Search ................. 212/316, 318, 212/324, 325, 320, 270; 414/140.3, 140.4, 141.3, 141.4, 141.6, 803

(56) References Cited

U.S. PATENT DOCUMENTS

| | | | | |
|---|---|---|---|---|
| 5,515,982 A | * | 5/1996 | Hasegawa et al. | 212/316 |
| 5,951,226 A | * | 9/1999 | Fantuzzi | 414/141.3 |
| 6,068,435 A | * | 5/2000 | Borjesson | 414/140.3 |

* cited by examiner

Primary Examiner—Thomas J. Brahan
(74) Attorney, Agent, or Firm—Cohen, Pontani, Lieberman & Pavane

(57) ABSTRACT

A loading device for ISO containers in a container terminal with a container bridge for the loading and unloading of ships and with automatic incoming and outgoing transfer of the containers by means of automatic guided vehicles, with at least one container load suspension device in the form of a spreader and devices for the intermediate positioning of the container within the loading device to allow the installation or removal of the twistlocks, and with platforms for the workers performing this task. The loading device consists of a polar bridge crane, which can rotate around its center vertical axis, and which is designed as a bridge crane with a trolley capable of traveling on a crane bridge supported on a circular track located in the rear area of the land-side rail of the container bridge.

14 Claims, 6 Drawing Sheets

LOADING DEVICE FOR ISO CONTAINERS

BACKGROUND OF THE INVENTION

1. Field of the Invention

The invention pertains to a loading device for ISO containers in a container terminal with a container bridge for the loading and unloading of ships and with the automated incoming and outgoing transport of the containers by means of automatic guided vehicles. The loading device is equipped with at least one container load suspension means in the form of a spreader, with devices for the intermediate positioning of the containers within the loading device to allow the installation or removal of the twistlocks, and with platforms for the personnel engaged in this work.

2. Description of the Related Art

German Utility Model No. 297 19 466 describes a transfer system for containers, in which a container bridge formed by a straddle frame is used. The straddle frame is supported on a traveling gear, which can move along rails parallel to the dock to which the ship is moored. The straddle frame has a boom, which extends out beyond the support structure both toward the water side and toward the land side; rails for a trolley are also attached to the straddle frame, so that the trolley, with the help of a spreader, can transport containers from the ship to the dock and vice versa. The spreader is designed so that the crane operator can bring it into automatically interlocking engagement with the container and release it again when desired.

The productivity-determining factor of a transfer unit such as this is the time it takes for the trolley to perform one load cycle, that is, the time required to convey the containers between the standing areas and to remove or install the twistlocks. As is generally known, these twistlocks are used to prevent the containers from sliding around after they have been stacked on top of one another in the standing areas and especially while they are being transported by ship. The containers are locked together by the twistlocks, which are first inserted into openings in the corner castings and then rotated. In most cases, semi-automatic twistlocks are used, which are attached in a preliminary position to the corner castings at the bottom of the container during loading. When the container is set down onto another container, the twistlocks automatically latch into the corner castings of the container underneath, so that these two containers are permanently attached.

When the container is then to be transferred from its location, the workers first release the locks holding it to the container underneath or to the container vehicle, and then the upper container is conveyed from the ship to the dock along with the twistlocks, which are still attached to it. The twistlocks, however, must be removed before the container can be set down onto the dock, which is also done by hand, in that the assigned workers grip under the hanging container, disconnect the twistlocks manually, and remove them. Conversely, when a container is to be loaded into a ship, it is first raised high enough to allow the twistlocks to be inserted by hand into the lower corner castings, and then the container can be transported to its location.

German Utility Model No. 297 19 466 describes the loading and unloading of the containers in two overlapping phases, for which two trolleys are used. The first trolley transports the container from the ship to a manipulation platform, and the second trolley transports the container from the platform to the desired track on the dock, where a vehicle is standing by to accept the container. The two trolleys, which transport the containers in an overlapping manner in time, shorten the productive work cycle time, because it was found that less time is required to transport a container between the ship and the platform than to transport a container to the unloading track on the dock, including the removal or attachment of the twistlocks.

The known solution is disadvantageous because, although the use of the second trolley in the container bridge increases the transfer capacity, it also leads to additional, relatively high investment, maintenance, and repair costs. In addition, the platform used in the known solution for installation and removal of the twistlocks is not suitable for the handling of tank containers or other special types of containers (e.g., cooling containers or containers for loading passenger vehicles). Although the support surfaces for the containers described in the prior art allow free access to the corner castings, a closed container bottom is absolutely necessary for this technique to work. This condition is not always fulfilled in the case of special containers, however, which means that these containers must be sorted out and handled separately on the dock by additional workers.

SUMMARY OF THE INVENTION

Proceeding from the state of the art indicated above, the task of the present invention is to increase the transfer capacity of the container bridge by low-cost measures and thus to ensure at the same time the reliable installation and removal of the twistlocks at the corner castings.

In accordance with the invention, the loading device includes a polar bridge crane which can rotate around its vertical center axis and which is designed as a bridge crane with a trolley traveling on the bridge. This polar bridge crane is located behind the land-side rail of the container bridge and is supported on a circular track.

The loading device according to the invention solves the problems of the known systems. It replaces the second trolley in the container bridge, but at the same it makes it possible for the containers to be rotated around an angle of at least 90°. As a result, the loading device of the invention makes it possible to load automatic guided vehicles (AGVs) on at least three separate loading tracks. This buffer of three loading tracks and the ability of the AGVs to maneuver effectively in the backreach of the container bridge prevent bottlenecks in the higher-order logistics of the terminal. As a result, the number of AGVs ultimately required can be significantly reduced.

The loading device according to the invention is intended in particular for use as an add-on component to container bridges. The base of the circular track is preferably a horizontal expansion, extending toward the rear, of the container bridge. The loading device, which is permanently connected to the connecting carriers of the container bridge supports, performs a certain part of the load-transfer work and thus reduces the load cycle. The trolley of the container bridge is responsible only for transporting the container between the ship and the loading device, i.e., to the positions to which the tracks of the transport vehicles (AGVs) extend.

In accordance with another feature of the invention, however, it is also possible for the base of the circular track to be the crane bridge of a mobile straddle unit with traveling gears for road or rail. The straddle unit in this case is the carrier of the bridge crane, on which the devices for intermediate positioning of the containers are mounted.

For the transfer of the containers from the trolley of the container bridge to the loading device, the spreader is positioned at a point which is optimal for the load cycle.

After the container has been transferred to the loading device, the bridge crane rotates around its vertical axis while its trolley is simultaneously moving to a position in which it can load the transport vehicle, this position being specific to the bridge and determined by the higher-order logistics of the container terminal.

In accordance with another feature of the invention, it is especially favorable for the trolley of the bridge crane to be equipped with a lifting device, which is formed by a shaft-like base frame with vertical guides for the container suspended from the spreader and by a lifting frame surrounding the container. The lifting frame can be raised and lowered under the shaft-like base frame. The design and function of a lifting device of this type are described in detail in DE 199 58 501, to which U.S. Ser. No. 09/726,934 corresponds. After the container has been unloaded from the ship, the loading device according to the invention takes over the next part of the transfer process instead of the second trolley of the container bridge. Thus the container, which is hanging by its corner castings in the spreader of the container bridge trolley, is transferred to the lifting device, which can accept any container, regardless of size and type.

Because the containers involved are standardized ISO containers, the lifting device can use the upper corner fittings, the form and position of which are always clearly defined, to suspend the load. Thus, in accordance with another feature of the invention, after the container has been disconnected from the spreader, the lifting frame can be lowered together with the container toward the transport vehicle, for which purpose means for gripping and holding the spreader are provided at the bottom end of the base frame, and means for gripping and holding the container are provided on the lifting frame. The platform for installation and removal of the twistlocks is attached to the lifting device. The freely accessible twistlocks are removed by the workers on the platform, located underneath and to the side of the containers, so that the automated lifting device can now set the container down onto the transport vehicle.

When, in accordance with another feature of the invention, it is provided that the rotational movement of the bridge crane for maneuvering to a loading position can be superimposed on the longitudinal movement of the trolley on the crane bridge, the amount of time required to arrive at certain loading track, which has been previously determined by the higher-order logistics of the container terminal, can be considerably decreased.

As already described in detail in DE 199 58 501, the base frame of the lifting device forms a guide shaft, tapering downward, which grips and guides the lowered spreader with its container along the long sides. The shaft is provided with vertical slideways along its inside surfaces, i.e., the surfaces facing the long sides of the container. Two bolts which project from the middle of the spreader on both sides and which can move in and out, engage in these slideways. The guide shaft grips the container and the spreader quickly, and the extendable bolts take care of the fine positioning in the longitudinal direction, as a result of which the container is brought into the correct position for locking.

In addition, eight remote-controlled load suspension locking bolts are provided along each of the two long sides, at the bottom end of the base framework facing the lifting frame, the arrangement of these bolts corresponding to that of openings in the fittings of the standardized spreader. The invention takes advantage of the fact that an oval opening is provided at the end of each of the twistlock supports on the spreader. A standard spreader has four twistlocks, which are set at 20 ft., 40 ft., or 45 ft., depending on the size of the container. In the case of a twin-lift spreader, there are two times four twistlocks present, which are set at 20 ft., 2×20 ft., 40 ft., or 45 ft. (maximum of 8 positions per side), depending on the size of the container. Load suspension (LS) locking bolts, on which the spreader rests in its end position, slide into the oval openings at the ends of the spreader as the spreader approaches. A reversal of the active and passive function of the LS locking function is also conceivable; that is, the oval openings could be located on the lifting device and the LS locking bolts could be mounted on the spreader.

As an alternative, eight contact points for a maximum of eight remote-controlled hydraulic LS pivot stops are provided along each long side at the bottom end of the base frame facing the lifting frame. These stops are mounted on the standardized spreader at the twistlock supports in such a way that they can pivot inward and outward. These contact points bear the weight of the spreader and the container after the load has been set down.

It is also provided in accordance with the invention that, in the upper area of each long side of the lifting frame, eight remote-controlled load locking bolts are provided, the arrangement of which corresponds to the arrangement of openings in the corner fittings of the ISO container. After the spreader has come rest on the LS locking bolts of the base frame, the load locking bolts of the lifting frame move in accordance with the load-dependent spreader setting into the lateral oval openings in the container corners. Preferably at this point the lifting frame of the lifting device according to the invention is located approximately 50 mm underneath the base frame, where the base frame and the lifting frame are centered with respect to each other.

It is also provided in accordance with the invention that the lifting frame is suspended by four vertically oriented hydraulic cylinders or by the lift cables of a cable hoist mechanism attached to the base frame. In the case that hydraulic cylinders are used, the ends of the rods which act on the lifting frame are provided in each case with a slot extending in the lifting direction. The hydraulic cylinders make it possible for the lifting frame to be raised with respect to the base frame so that the twistlocks can be released, and they also allow the ISO container held in the lifting frame to be lowered toward the dock or the transport vehicle.

In accordance with another feature of the invention, it is provided that areas of the long side of the platform suspended from the base frame, i.e., areas facing the container, can be swung down from an essentially vertical waiting position, to which these long sides have been raised to increase the size of the loading shaft, into a horizontal working position, close to the container, so that the twistlocks of the containers can be installed or removed. After the twistlocks have been installed or removed, these long sides can then be swung back up again into the essentially vertical waiting position, in which vertical position these sides simultaneously prevent the workers from falling.

A working method for operating a lifting device according to the invention includes the following steps:

As soon as the ship is unloaded, the container hanging from the spreader is lowered from above into the lifting device and centered at the same time. The spreader is then connected to the lifting device, for which purpose the load suspension locks provided on the base frame (alternatively on the spreader) are used. The container, still suspended from the spreader, is accepted by the lifting frame, for which purpose the lifting frame uses the upper corner fittings of the container, the positions of which are clearly defined. The lifting frame is now raised slightly; the connection between the spreader and the container is released; the spreader is moved back; the pivoting parts of the platform are lowered toward the container; and the twistlocks are released by the workers. After the twistlocks have been released, the workers on the platform return to a position opposite the loading shaft. The pivoting parts of the platform are raised again. The container, together with the lifting frame and the platform, is turned 90° by the rotation of the bridge crane around its vertical axis and simultaneously moved into position by the motion of the trolley of the bridge crane above one of the three loading tracks of the automatic guided vehicles (AGVs). The container, which has now been brought into its transfer position, is still hanging in the lifting frame and is lowered together with the frame until it has reached the vehicle.

The pivoting stops pivot over the corner fittings of the container, while the container, still hanging in the lifting frame, is being lowered along with the frame until it reaches the vehicle. The setting of the container down onto the vehicle has the effect or reducing the short distance between the pivoting stops and the corner fittings to zero.

After the locks between the lifting frame and the container have been released, the lifting frame is moved back to the base of the lifting device and is thus ready to accept a new container.

The novel device is advantageous as a low-cost addition to known transfer systems. Depending on the container transfer system, either a stationary or a mobile embodiment can be considered. The costs of acquisition and maintenance are much lower than those of conventional solutions as proposed by the associated state of the art. The device is suitable for completely automated operation an of the container terminal can thus be significantly increased by the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
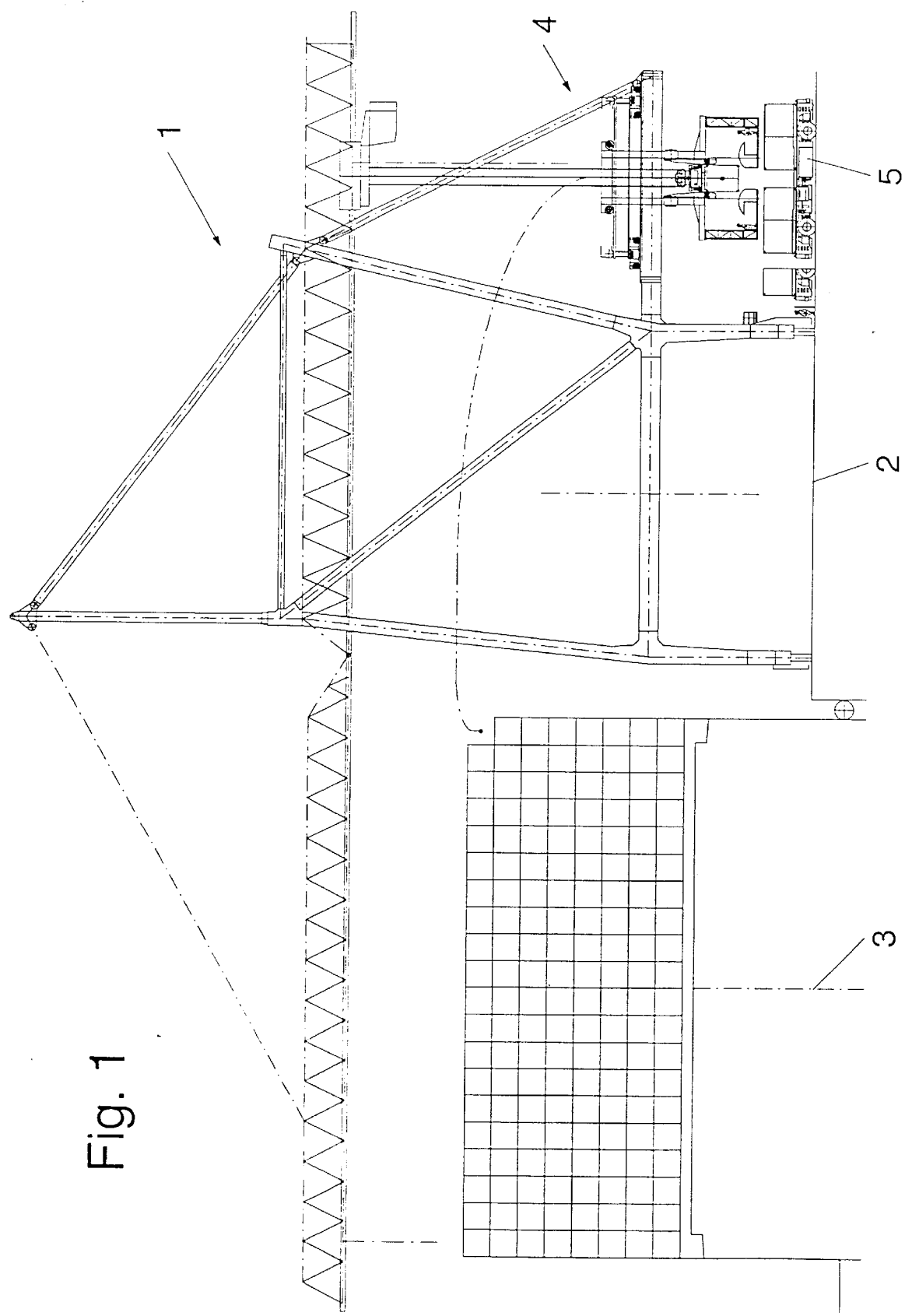
FIG. 1 shows a side view of a container bridge with the loading device according to the invention.
Figure 2:
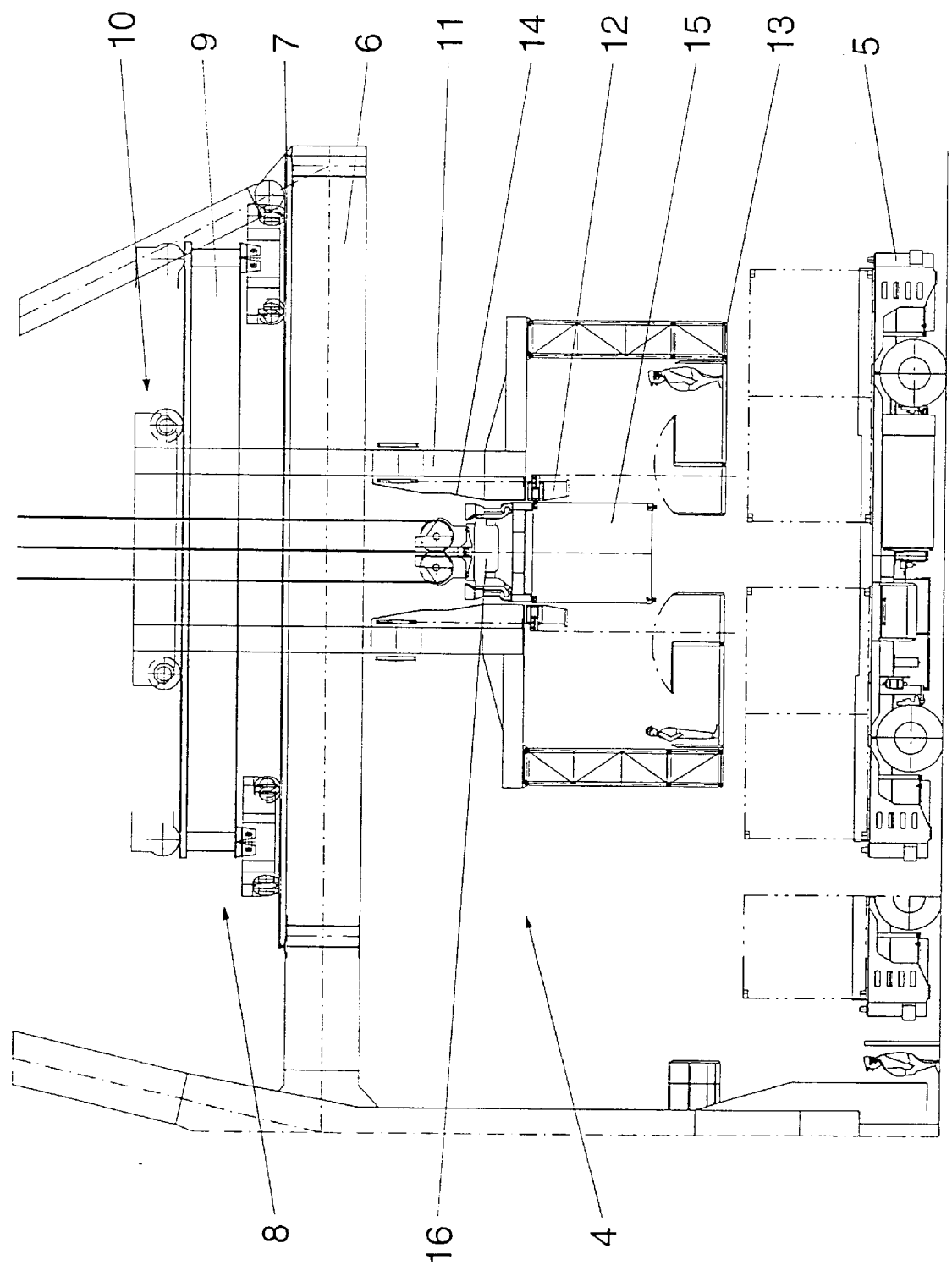
FIG. 2 shows a detailed view of the loading device according to the invention.

FIG. 1 shows the container bridge 1 with the supplemental loading device 4 in front of a container ship 3, moored to a dock 2. Underneath the loading device are the loading tracks of the automatic guided vehicles (AGVs) 5. Referring to FIG. 2, the trolley 7 of the container bridge 1 transports the container 15 hanging from the spreader 16 to the loading device 4 according to the invention. This device include a rear bridge carrier 6 with its circular track 7 and the bridge crane 8, designed as a polar bridge crane. The latter is formed by the crane bridge 9 and the trolley 10, where the trolley 10 holds the base frame 11, the lifting frame 12, and the platform 13 for the workers.

The base frame 11 contains a guide shaft 14, which becomes narrower as it proceeds downward and as a result is able to grip and guide the container 15 and the spreader 16 quickly at the long sides. The long side of the loading device 4 is parallel to the edge of the dock 2. Underneath the loading device are the AGVs 5, standing by.

Figure 3:
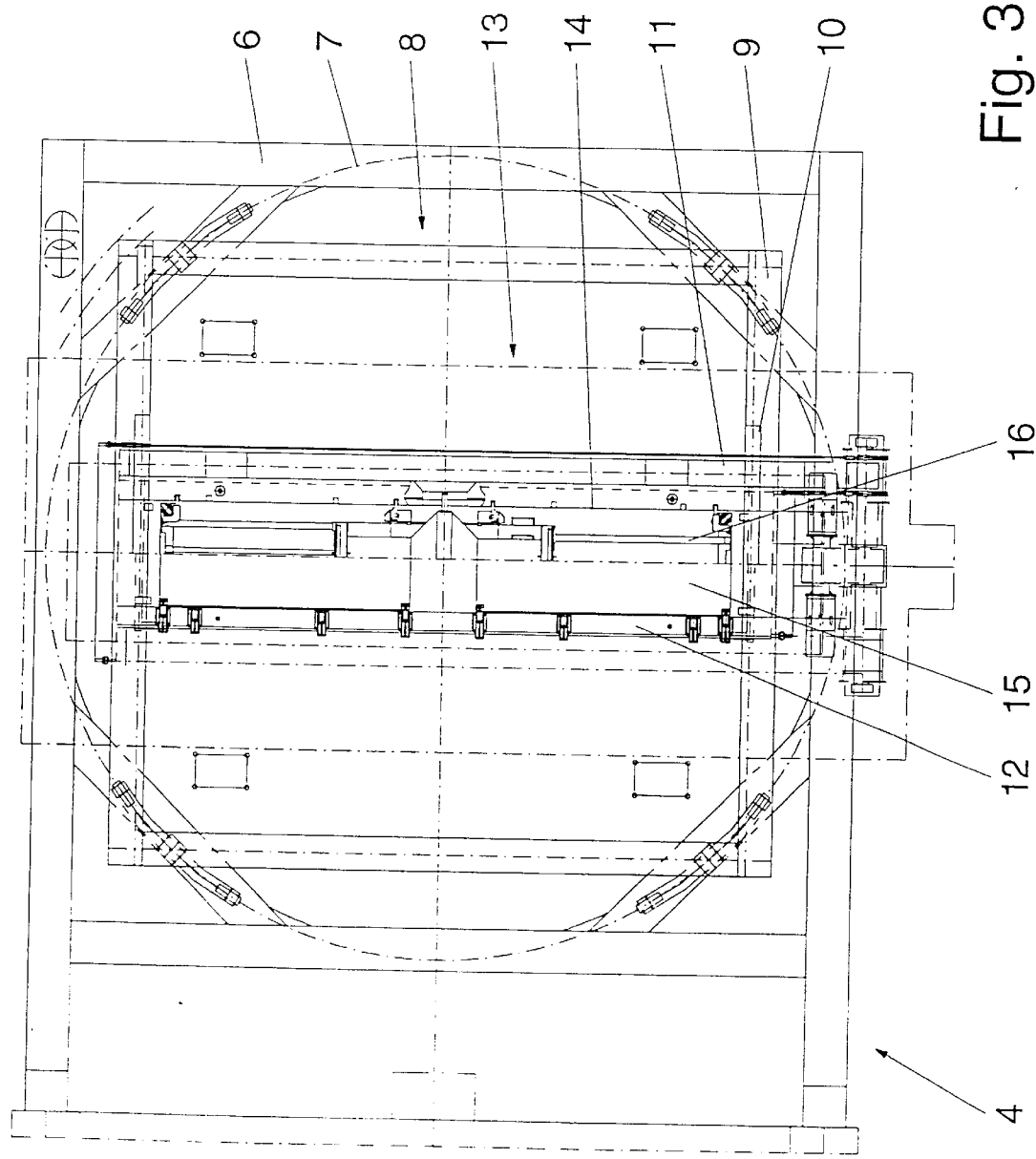
FIG. 3 shows a view of the device according to FIG. 2 from above.

FIG. 3 shows a view of the loading device according to FIG. 2 from above. It is possible to recognize the bridge carrier 6 with its circular track 7, the bridge crane 8, designed as a polar bridge crane; the crane bridge 9 with the trolley 10; the base frame 11; the lifting frame 12; and the platform 13 for the workers. It is also possible to see the guide shaft 14, which becomes narrower as it extends downward, and which thus is able to grip and guide the container and the spreader 16 quickly along the long sides.

Figure 4:
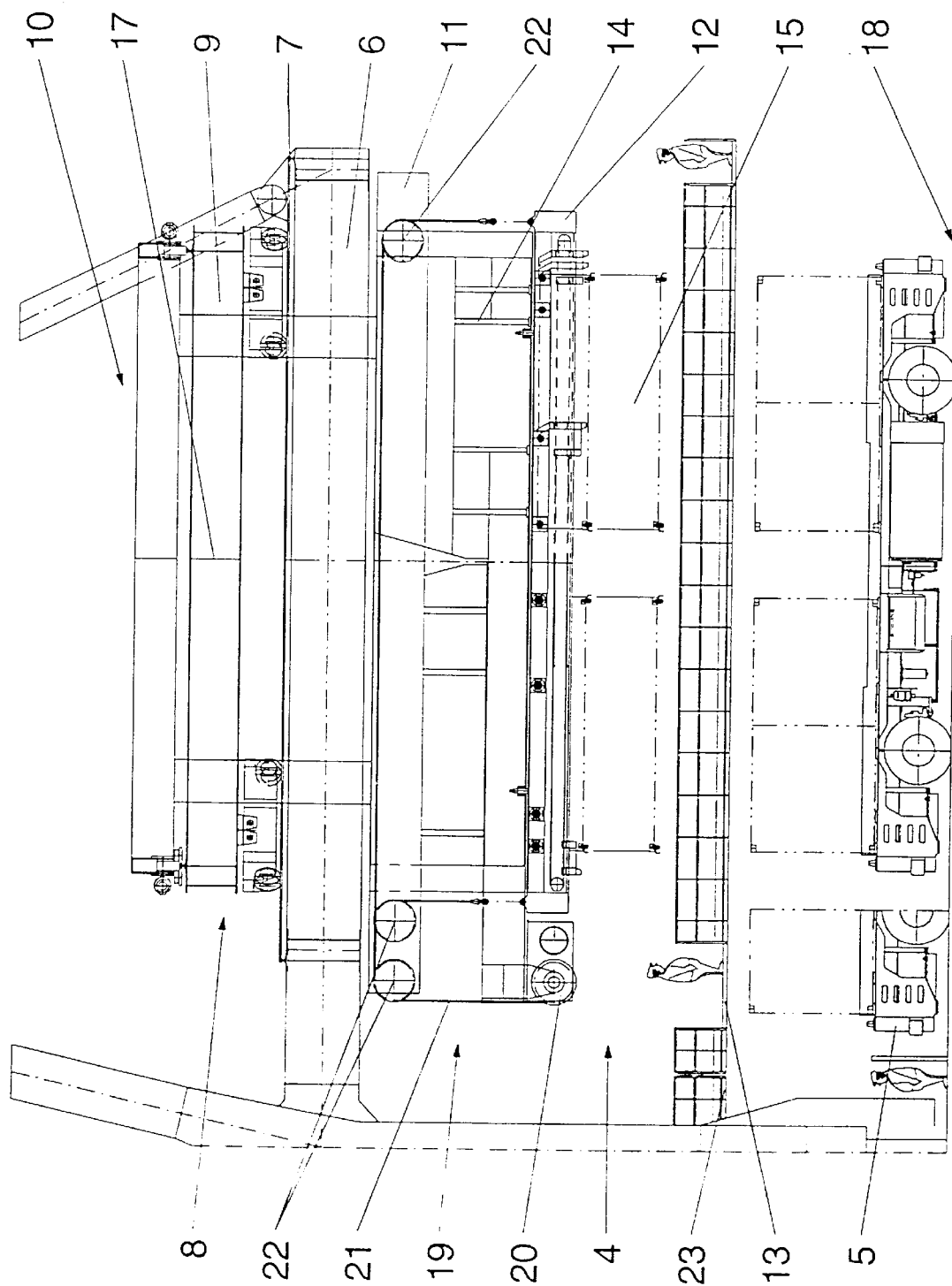
FIG. 4 shows a detailed view of the loading device after it has been rotated 90°.

FIG. 4 shows the loading device in another phase of the work. The lifting frame 12 has accepted the container 15. The bridge crane has completed a 90° turn around its vertical center axis 17. Superimposed on this rotational movement, the trolley 10 has steered toward the AGV loading track 18 specified by the higher-order logistics of the container terminal. Underneath the loading device, the AGVs 5 are standing by. FIG. 4 also shows the lifting mechanism 19, supported on the base frame 11; this unit consists of a winch 20, the four cables 21, and the deflection pulleys 22, which lower the lifting frame 12, including the container 15, toward the dock. Underneath the lifting frame 12, it is possible to see the platform 13, which has been swung down from a waiting position at the side into a working position, that is, in the direction of the container 15. The containers 15 are lowered the exact amount depending on the specific type of container until the twistlocks at the corners of the container can be easily reached by the workers. The twistlocks are installed or removed by the workers standing on the platform 13.

Figure 5:
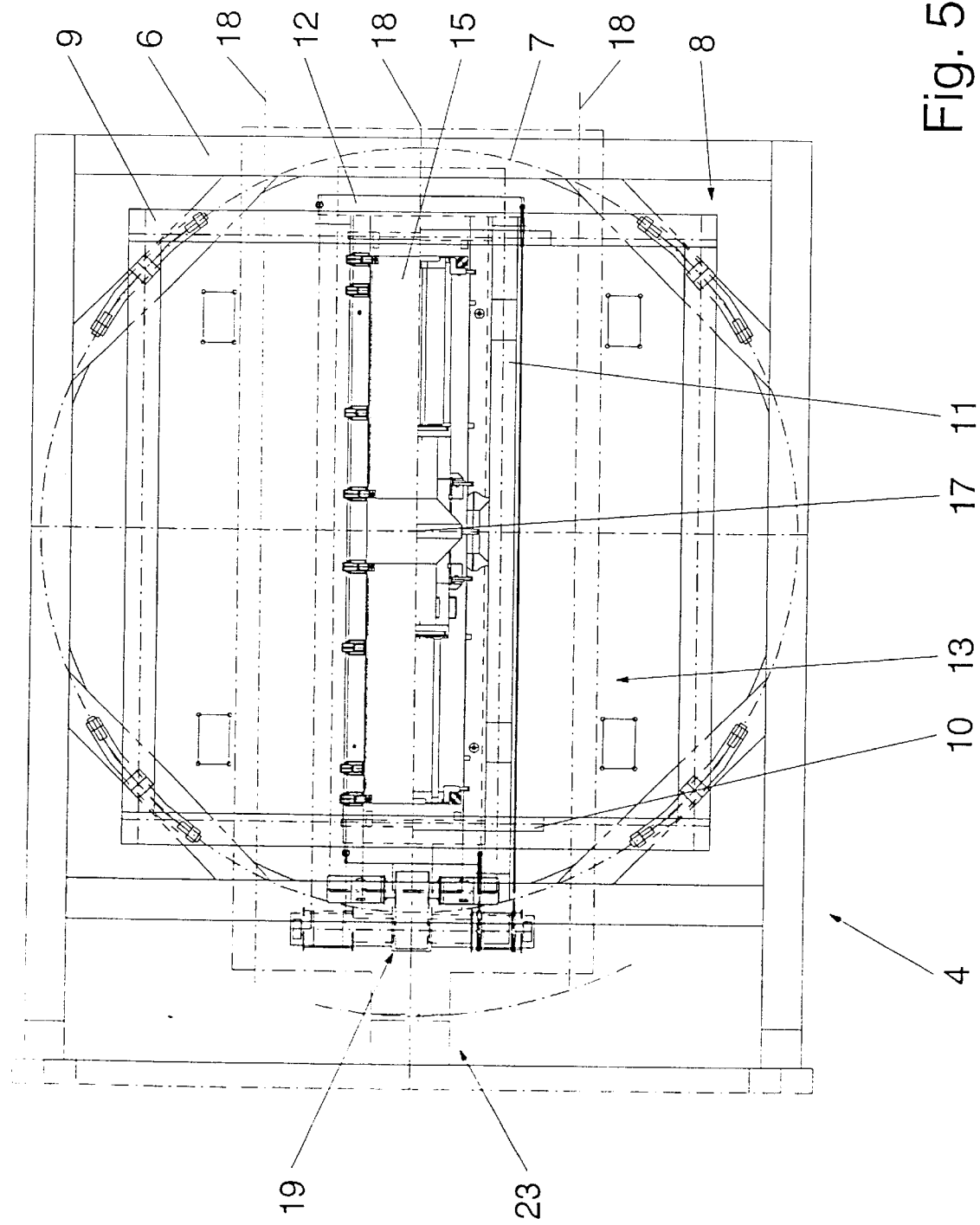
FIG. 5 shows the device according to FIG. 4 from above.

In the view shown in FIG. 5, the bridge crane 8 has completed its 90° turn around the center vertical axis 17. Superimposed on this rotation, the trolley 10 has steered toward an AGV loading track specified by the higher-order logistics of the container terminal. The lifting mechanism 19 supported on the base frame 11 lowers the lifting frame further downward.

In the position of the bridge crane 8 and its trolley 10 shown, the platform for the workers 13 is in such a position relative to the container bridge 1 that it is possible for the workers to reach the platform or leave it by way of a ladder 23.

Figure 6:
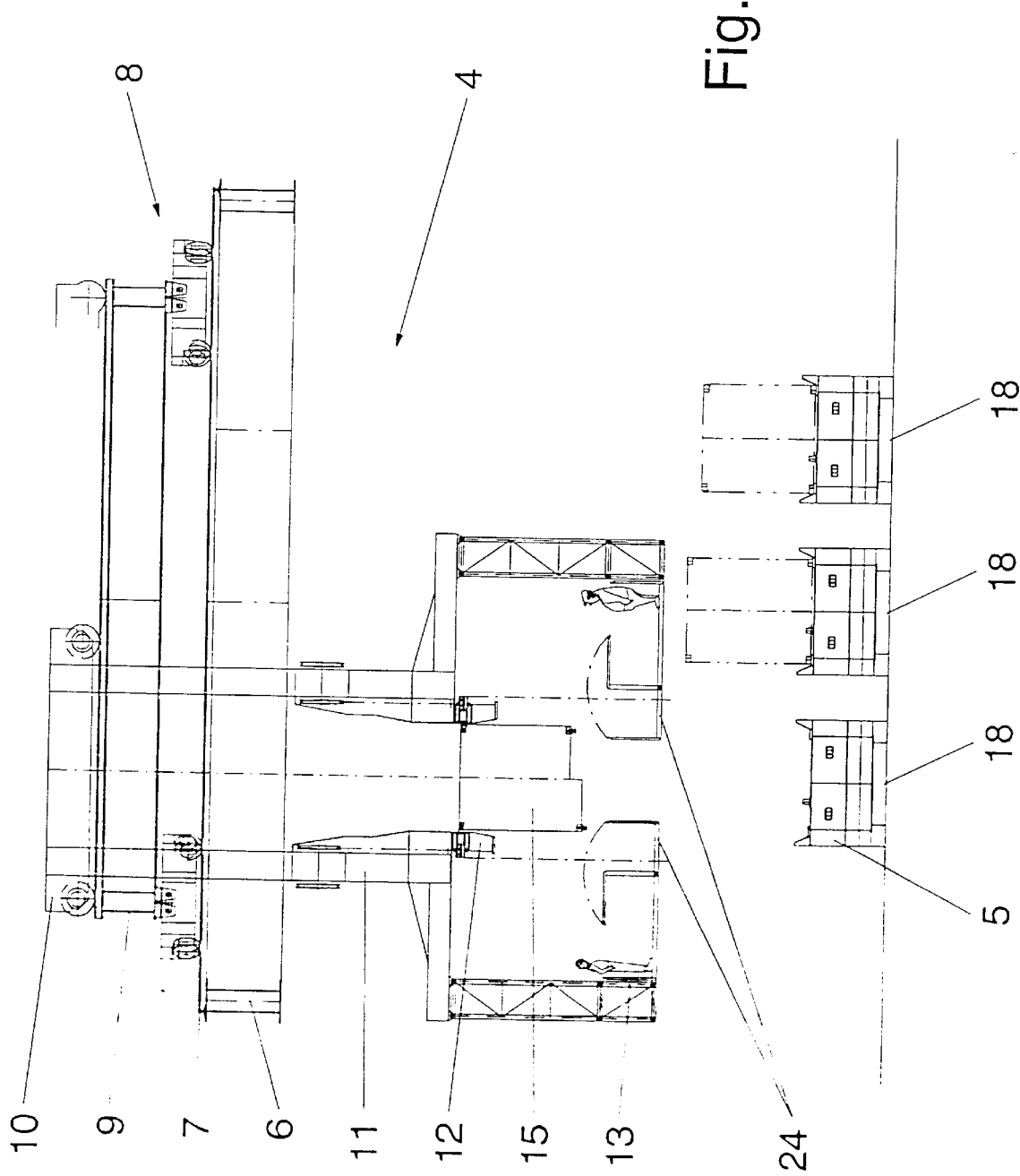
FIG. 6 shows a cross section through the loading device, which has been rotated 90° and positioned on an external AGV track.

FIG. 6 shows a cross section through the loading device, which has turned 90°. The lifting frame 12 has accepted the container 15; the bridge crane has completed its 90° rotation around its center vertical axis. At the same time that the bridge crane was rotating, the trolley 10 steered toward one of the three loading tracks 18 provided. The load can now be set down onto the transport vehicle (AGV 5). Before the load is lowered, the long sides 24 of the platform 13 on the inside are swung upward by 90° around a horizontal axis, after the workers have moved to a safe place, monitored by sensors.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A loading device for ISO containers in a container terminal of the type comprising a container bridge for the loading and unloading of ships and for the automated incoming and outgoing transfer of the containers by means of automatic guided vehicles, said container bridge having a seaward support and a landward support, said device comprising
    a circular track on said container bridge to the rear of said landward support with respect to said seaward support,
    a crane bridge supported on said circular track and rotatable about a central axis, and
    a trolley which can travel on said crane bridge for transporting a spreader for positioning an ISO container suspended from said spreader so that twistlocks thereon can be installed and removed by workers on a platform suspended from said trolley.

2. A loading device as in claim 1 wherein said circular track has a base comprising a horizontal expansion of said container bridge which extends rearward from said landward support.

3. A loading device as in claim 1 further comprising a mobile straddle unit which rides on said container bridge, said circular track having a base on said mobile straddle unit.

4. A loading device as in claim 1 further comprising a lifting device suspended from said trolley, said lifting device comprising a base frame having vertical guides for an ISO container, and a lifting frame installed underneath the base frame for raising and lowering an ISO container.

5. A loading device as in claim 4 wherein said lifting frame comprises means for gripping and holding the container, said base frame comprising means for gripping and holding said spreader while said container is being lowered by said lifting frame.

6. A loading device as in claim 4 wherein said vertical guides form a guide shaft which becomes narrower as it extends downward, said guide shaft having inside surfaces provided with vertical slideways which engage bolts extending from the spreader as it is lowered through the guide shaft with the container.

7. A loading device as in claim 4 wherein said base frame has a bottom end with two long sides, said loading device further comprising eight remotely actuated load suspension locking bolts provided on each said long side facing the lifting frame, said bolts being arranged to engage in openings of a standardized spreader.

8. A loading device as in claim 4 wherein said base frame has a bottom end with two long sides, said loading device further comprising eight support points for a maximum of eight remotely actuated hydraulic load suspension pivot stops along each long side facing the lifting frame, said stops being pivotable inward and outward to engage twistlock supports of a standardized spreader.

9. A loading device as in claim 4 wherein said lifting frame has two long sides, said loading device further comprising eight remotely-actuated load suspension locking bolts on each long side of the lifting frame, said locking bolts being arranged to engage openings in the fittings of an ISO container.

10. A loading device as in claim 4 further comprising four vertically acting hydraulic cylinders attached to the base frame, each said cylinder having a rod by which said lifting frame is suspended, each said rod having a vertical slot.

11. A loading device as in 4 further comprising a cable hoist attached to the base frame, said cable hoist comprising four lifting cables by which said lifting frame is suspended.

12. A loading device as in claim 4 wherein said platform is suspended from said base frame, said platform having long sides which face the path of a container being lowered by said lifting frame, said long sides being pivotable between a vertical waiting position, wherein workers are protected from falling, and a horizontal working position, wherein workers can install or remove twistlocks on a container.

13. A loading device as in claim 1 wherein said trolley can travel on said crane bridge while said crane bridge rotates on said track for maneuvering said trolley toward a loading position.

14. A method for operating a loading device for ISO containers in a container terminal of the type comprising a container bridge for the loading and unloading of ships and for the automated incoming and outgoing transfer of the containers by means of automatic guided vehicles, said container bridge having a seaward support and a landward support, said device comprising a circular track on said container bridge to the rear of said landward support with respect to said seaward support, a crane bridge supported on said circular track and rotatable about a central axis, a trolley which can travel on said crane bridge for transporting a spreader for positioning an ISO container suspended from said spreader so that twistlocks thereon can be installed and removed by workers on a platform suspended from said trolley, said platform having long sides which face the path of a container being lowered, and a lifting device suspended from said trolley, said lifting device comprising a base frame and a lifting frame mounted underneath the base frame, said method comprising
    lowering a container suspended from the spreader into the shaft-like base frame,
    connecting the container to the lifting frame,
    raising the lifting frame slightly,
    releasing the container from the spreader,
    retracting the spreader,
    pivoting the long sides of the platform to a horizontal working position,
    detaching the twistlocks from the container,
    pivoting the long sides of the platform to a vertical waiting position,
    maneuvering the container, together with the lifting frame and the platform, to a transfer position by a 90 degree rotation of the crane bridge about the vertical axis and simultaneous travel of the trolley,
    lowering the lifting frame and the container to a transport vehicle on one of three loading tracks,
    releasing the container from the lifting frame, and
    raising the lifting frame back to the bottom of the base frame.

* * * * *